(12) United States Patent
Ferran Palau

(10) Patent No.: US 7,275,649 B2
(45) Date of Patent: Oct. 2, 2007

(54) ASSEMBLY SYSTEM FOR AN ELECTRICAL DISTRIBUTION BOX

(75) Inventor: Ignasi Ferran Palau, Valls (ES)

(73) Assignee: Lear Corporation, Southfield, MI (US)

( * ) Notice: Subject to any disclaimer, the term of this patent is extended or adjusted under 35 U.S.C. 154(b) by 328 days.

(21) Appl. No.: 10/904,726

(22) Filed: Jan. 14, 2005

(65) Prior Publication Data

US 2006/0158832 A1    Jul. 20, 2006

(51) Int. Cl.
*H02G 3/08* (2006.01)
*H01J 5/00* (2006.01)

(52) U.S. Cl. .......................... 220/3.2; 220/3.3; 174/50

(58) Field of Classification Search .............. 220/3.4, 220/3.5, 3.3, 3.7, 3.9, 3.2; 174/54, 58, 61, 174/48, 503, 481

See application file for complete search history.

(56) References Cited

U.S. PATENT DOCUMENTS

| | | | |
|---|---|---|---|
| 5,777,843 A * | 7/1998 | Younce | 361/641 |
| 6,036,530 A * | 3/2000 | Edwards et al. | 439/455 |
| 6,833,503 B2 * | 12/2004 | Lopez et al. | 174/50 |

FOREIGN PATENT DOCUMENTS

| | | |
|---|---|---|
| EP | 1339273 A1 | 8/2003 |
| EP | 1469572 A1 | 10/2004 |

* cited by examiner

*Primary Examiner*—Anthony D. Stashick
*Assistant Examiner*—Shawn M. Braden
(74) *Attorney, Agent, or Firm*—Bruce E Harang

(57) ABSTRACT

An assembly system for an electrical distribution box designed to allow pre-assembly of the electrical connections within the electrical distribution box before final assembly of the electrical distribution box within a vehicle.

3 Claims, 3 Drawing Sheets

ASSEMBLY SYSTEM FOR AN ELECTRICAL DISTRIBUTION BOX

OBJECT OF THE INVENTION

The present invention refers to an assembly system for an electrical distribution box, which has been specially designed in order to achieve a pre-assembly position for said box, prior to its final assembly, facilitating the introduction of the corresponding connectors in said box.

The system is especially suitable for being used in the automotive field, where the connectors of the different electronic and power circuits are housed inside boxes, where they must be duly protected, boxes which are difficult to access in the final assembly position, for an obvious better exploitation of the available space.

Therefore, the object of the invention is to achieve that the box can be pre-assembled in conditions of easy accessibility to the inside thereof, to finally carry out its final assembly after the arrangement of the connectors inside the box.

BACKGROUND OF THE INVENTION

In the field of the preferred practical application of the invention, the automotive industry, electrical distribution boxes intended for housing the connectors of the different circuits are used, boxes which must be suitably fixed in the area provided for the final arrangement thereof.

The scarce availability of space implies that, on many occasions, once the box has been duly fixed in said final location area, it is difficult to access it and, as a result, it makes it very difficult, or practically impossible, to assemble the corresponding connectors inside the box.

This drawback is solved by carrying out said assembly of the connectors prior to the assembly of the distribution box itself, which in turn generates handling problems of another type, specifically the necessity for the operator to use one of his or her hands exclusively for supporting the distribution box, whereas he or she must carry out the terminal assembly operations with only his or her other hand, such that the work is slow and uncomfortable.

DESCRIPTION OF THE INVENTION

The assembly system proposed by the invention solves in a fully satisfactory manner the drawbacks set forth above, based on the fact that said assembly is carried out in two phases, a first pre-assembly phase and a second final assembly phase, such that after the first phase the distribution box is supported by the system, but in conditions of full accessibility to the inside thereof to introduce the corresponding connectors therein.

To this end and more specifically, a support participates in the system, a support which is suitably fixed to the vehicle, adopting a general U shape, such that its side branches are duly spaced so as to allow for the coupling of a marginal area of the electrical distribution box between them, said side branches having notches acting as guides intended for receiving respective side projections of the box, such that the latter is susceptible to pivoting on the support, said projections acting as a pivoting shaft, between an upright position for the box to a practically horizontal position, corresponding to the final assembly, passing through an intermediate position with a noticeable inclination in which the box is perfectly and comfortably accessible.

Said projections of the box, which are finished off in flat enlargements acting as axial retention means with regard to the support, have a nearly but not perfectly cylindrical shape, such that with a complementary shape of the notches of the support acting as a guide, the intermediate, pre-assembly position for the introduction of the connectors in the box is maintained stable since the projections butt against the notches.

The box is provided on its end opposite to said pivoting projections with fixing means to a second support, such as to a crossbar, for example, which usually traverses the vehicle in the front portion, the pivoting movement of the distribution box towards said second support furthermore being limited with a special shape of the flat enlargements finishing off the projections, enlargements adopting an elongated shape and which, at their ends, in said pivoting limit position, act on stops existing in the corresponding support fixed to the vehicle frame.

DESCRIPTION OF THE DRAWINGS

To complement the description being made and for the purpose of aiding to better understand the features of the invention, according to a preferred practical embodiment example thereof, a set of drawings is attached as an integral part of said description, a set of drawings in which the following has been shown with an illustrative and non-limiting character.

PREFERRED EMBODIMENT OF THE INVENTION

In view of the mentioned figures, it can be observed how a support (1) intended for being fixed to the vehicle body participates in the system proposed by the invention, a support adopting a general U shape and having on its middle branch standard elements (2) for carrying out said fixing, its side branches (3) being duly spaced so that the electrical distribution box (4) can be coupled between them.

Figure 1:
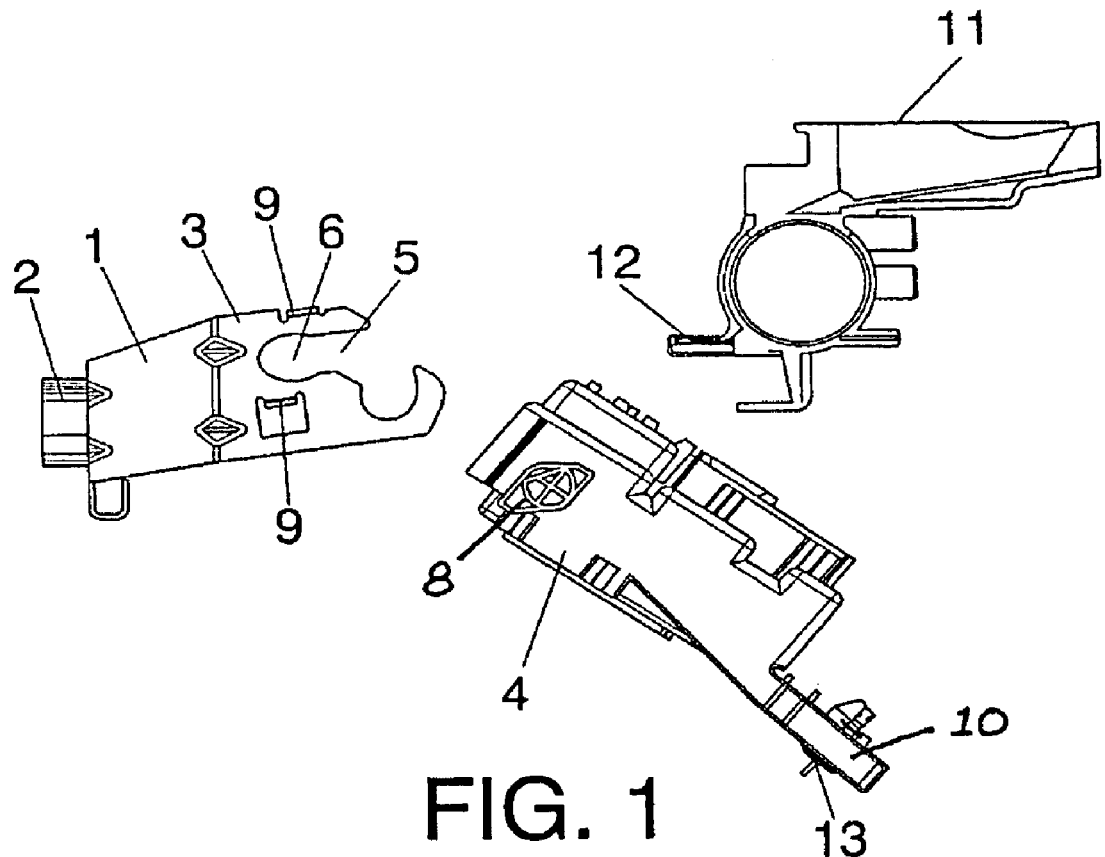
FIG. 1 shows an exploded side elevational view of an electrical distribution box with its corresponding pair of supports, according to the assembly system constituting the object of the present invention.
Figure 2:
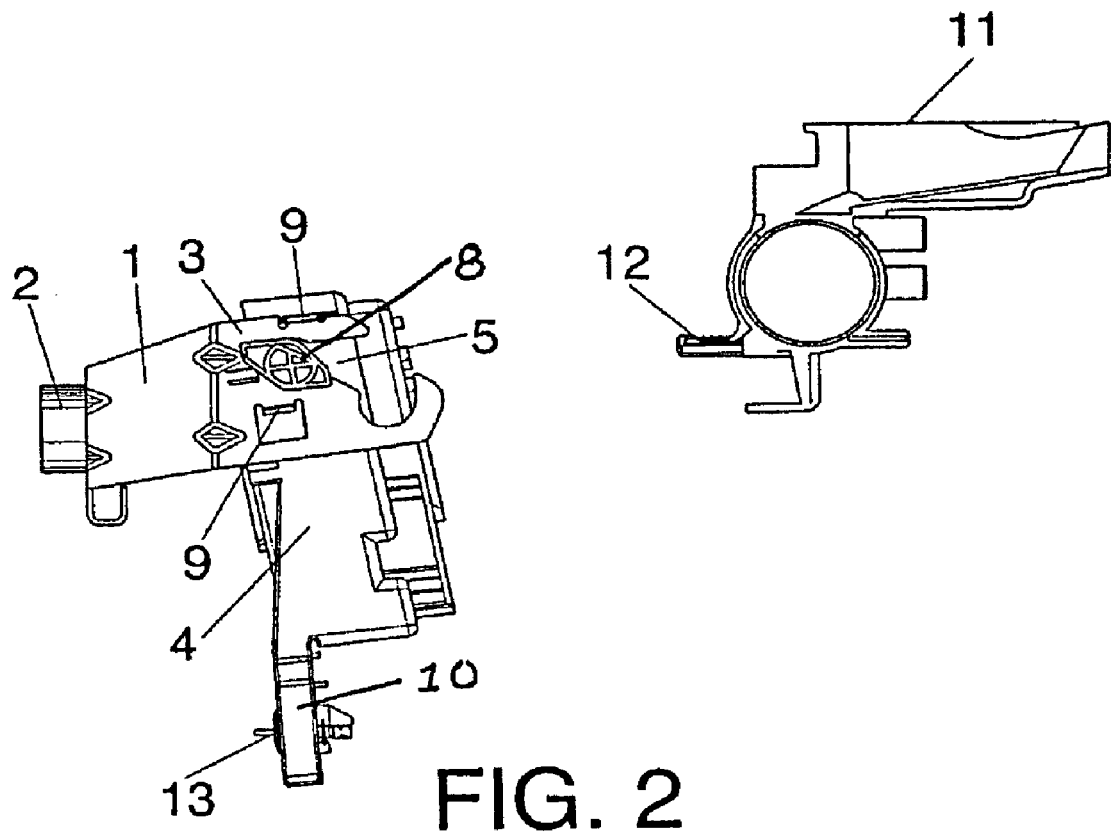
FIG. 2 also shows a side elevational view of the same assembly of the previous figure, in which the distribution box is shown pre-assembled on the first support.
Figure 3:
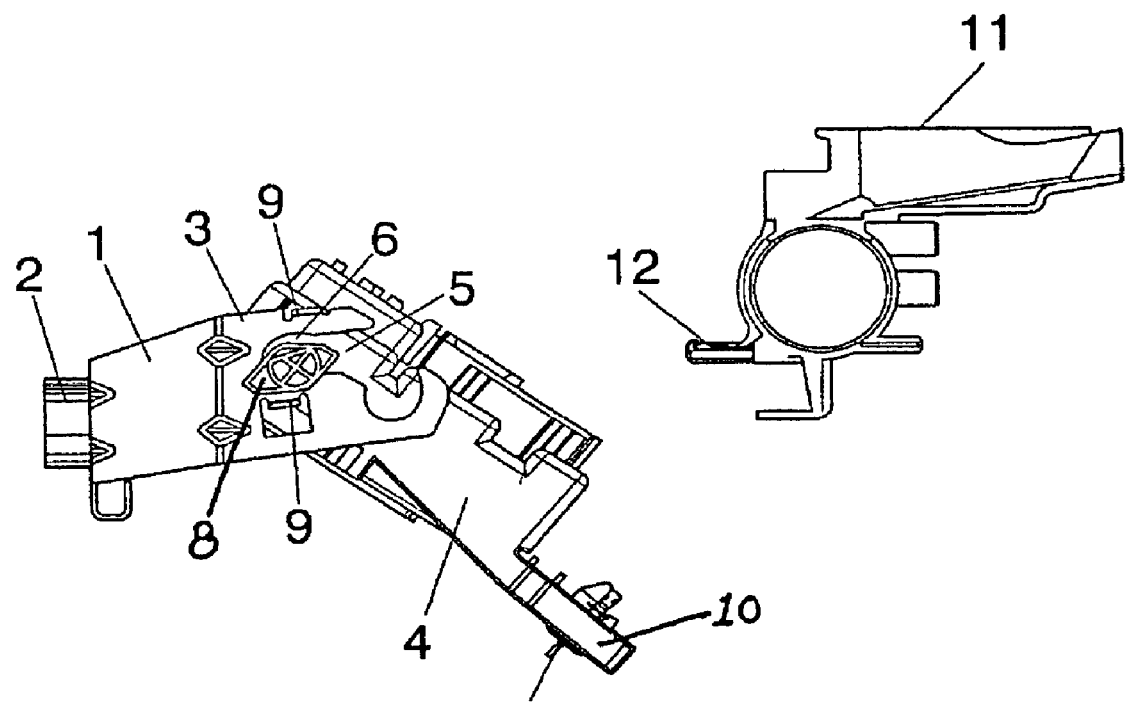
FIG. 3 again shows the assembly of FIG. 2, but with the box being in an assembly position on the inside thereof for the corresponding connectors.
Figure 4:
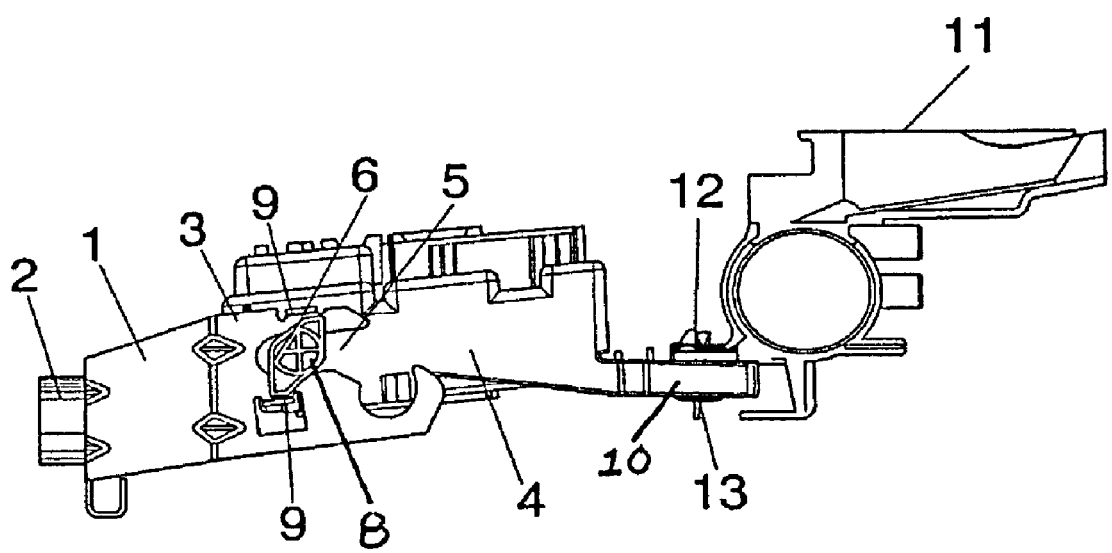
FIG. 4 again shows the assembly of FIGS. 2 and 3, also according to a side elevational view, in a fixing limit position of the box to both supports.
Figure 5:
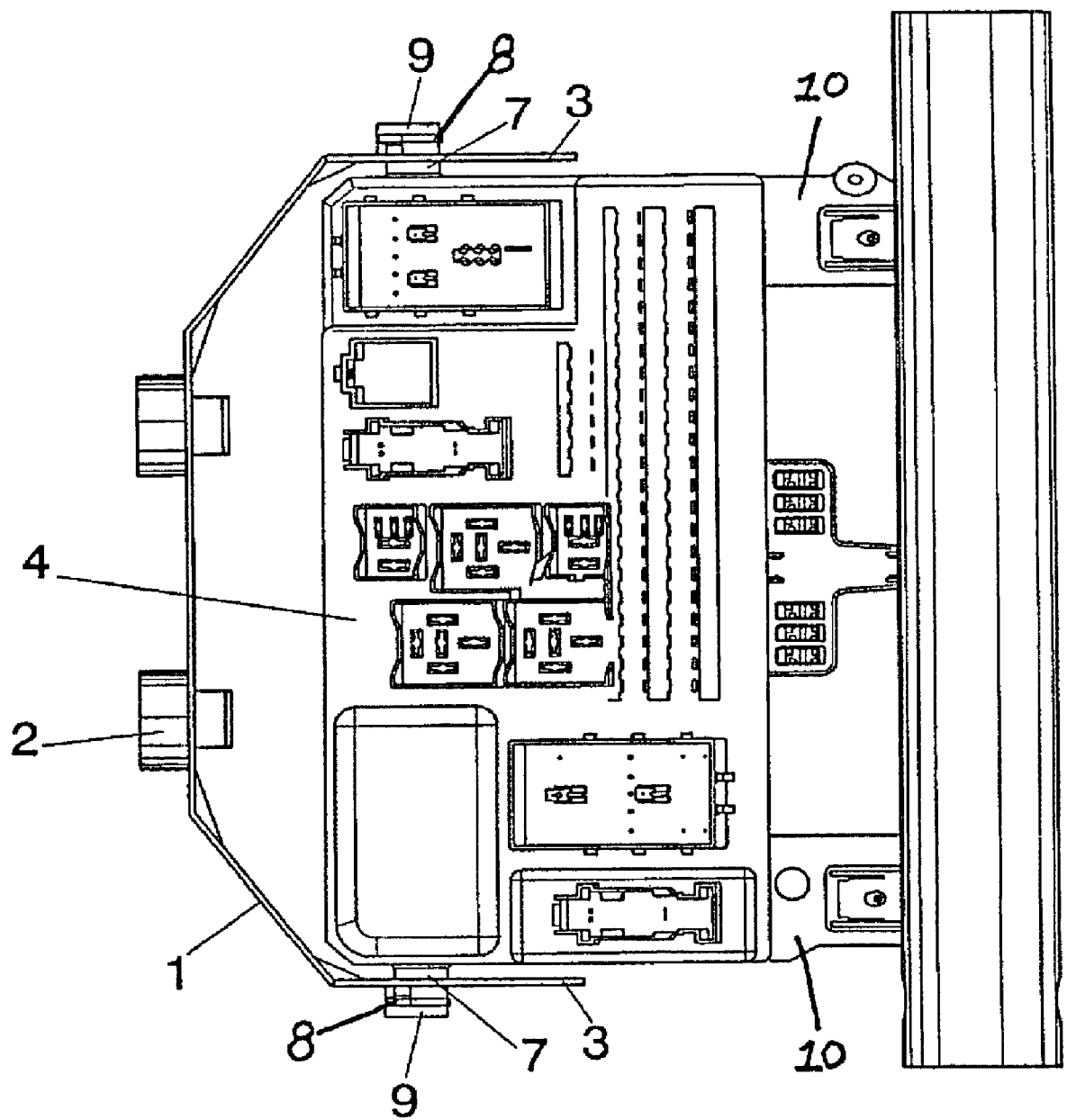
FIG. 5 finally shows a plan view of the assembly shown in the previous figure.

Respective notches (5) open towards their free end and finished off in an elliptical-shaped back (6) with scarce disparity between axes, are arranged on said side branches (3) of the support (1), said notches (5-6) constituting guides receiving respective side projections (7) existing on the likewise side walls of the distribution box (4), these projections (7) having an also elliptical section and being coaxial, such that they constitute a pivoting shaft of the box (4) with regard to the support (1), as can be inferred from observing FIGS. 2, 3 and 4.

The elliptical shape of the back (6) of the notches (5) and of the projections (7) of the box (4) allow that, after the coupling of said box (4) to the support (1) in the position shown in FIG. 2, said box (4) can pivot on the support (1) by means of a slight forcing on the articulation, after which the box (4) is able to keep the inclined position shown in FIG. 3 stable, wherein said box is perfectly accessible for the introduction of the connectors on the inside thereof.

As a complement for the described structure, said side projections (7) of the box (4) are finished off in flat and elongated enlargements (8), which have a double function, on one hand, to act as axial retention means of the box (4) with regard to the support (1), and on the other hand, that the ends of said enlargements (8) act on stops (9) existing on the side branches (3) of the support (1) in the final assembly limit position shown in FIG. 4, in which an extension (10) of the electrical distribution box (4) is fixable to a second support (11), for example a crossbar traversing the vehicle in the front portion of the box (4), and having flaps (12) to which said extension (10) is fixable by means of suitable fixing means (13), of any standard type, suitably arranged on said extension.

It is thus achieved that the box (4) can be assembled on the support (1) in the pre-assembly position shown in FIG. 3, in which the inclined positioning of said box (4) is perfectly stable, facilitating the incorporation therein of the electrical connectors, after which the box (4), continuing with its pivoting, is finally fixed to the second support (11) in the final assembly position shown in FIG. 4.

In addition to the electrical distribution box (4) itself, a support (1) intended for being fixed to the vehicle body, and a second support (11) opposite to the first one, participate in the system. The support (1) adopts a U shape with notches (5) on its side branches (3), open towards their free end, in which side projections (7) of the support, finished off in flat enlargements (8), are coupled, such that these projections (7), in a coaxial arrangement, form the pivoting shaft of the box (4) with regard to the support (1), these elements being provided with retention means able to keep the box (4) in an inclined pre-assembly position, providing easy access to its inside for the introduction of the corresponding connectors, after which the box (4) is susceptible to pivoting towards its final assembly position, in which an extension (10) opposite to said pivoting shaft rests on a flap (12) of the second support (11) to which it is finally fixed in the also final assembly position thereof.

What is claimed is:

1. An assembly system for an electrical distribution box, for use in an automotive vehicle allowing for a stable pre-assembly connector mounting position of said electrical distribution box comprising:

a first support (1) fixedly attached to an automotive vehicle body having a U shape consisting of a middle section, having two ends, fixedly mountable to an automotive vehicle by means of mounting elements (2) and a pair of legs (3) extending from each end of said middle section each leg having two ends, a first end of each of said legs being attached to an end of said middle section and a second end of each of said legs (3) being free, and each of said legs further having located therein on substantially the same axis facing toward said free ends a notch (5) having an elliptical-shaped back (6) for mounting an electrical distribution box (4);

an electrical distribution box (4) having a generally rectangular shape with two side walls and two end walls and located one each side wall on substantially the same axis a side projection (7) having elliptical shape and terminating in enlargement (8) allowing mounting, retention, and pivoting within said notch (5) of first support (1) legs (3), and further located on one end wall farthest from said side projections (7) an extension (10) attachable to a second support; and a second support (11) also fixedly attached to said automotive vehicle having flaps (12) for fixedly attaching said extension (10) by fixing means (13);

characterized in that said legs (3) of said first support (1) incorporate respective notches (5) having elliptically shaped back (6) defining guides for the coupling of said elliptically shaped side projections (7) of said electrical distribution box (4), providing for pivoting, coupling, and providing a stable inclined position prior to its final assembly.

2. An assembly system for an electrical distribution box according to claim 1, characterized in that said notches (5) having elliptically shaped back (6) of said legs (3) of said first support (1) and said elliptically shaped side projections (7) of said electrical distribution box (4) provide for stabilizing said electrical distribution box (4) in an inclined pre-assembly position during the operation of pivoting said electrical distribution box (4) on said first support (1).

3. An assembly system for an electrical distribution box according to the previous claims, characterized in that said terminating enlargements (8) of said elliptically shaped side projections (7) of said electrical distribution box (4) provide axial retention stops of said electrical distribution box (4) in relation to said first support (1), and further limit the pivoting movement of said electrical distribution box (4) by acting on stops (9) operatively arranged on said legs (3) of said first support (1).

* * * * *